Nov. 3, 1936.  V. W. KLIESRATH  2,059,245
MOTOR VEHICLE
Filed Jan. 14, 1933  4 Sheets-Sheet 2
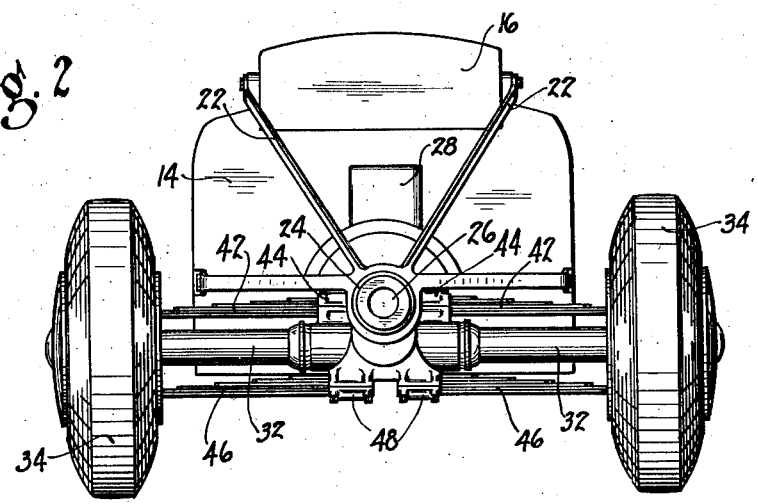
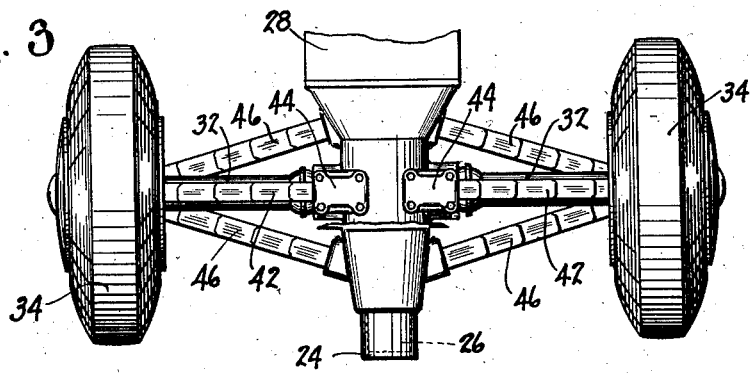
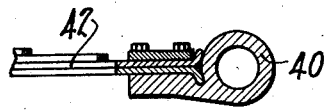
INVENTOR.
VICTOR W. KLIESRATH
BY
ATTORNEY.

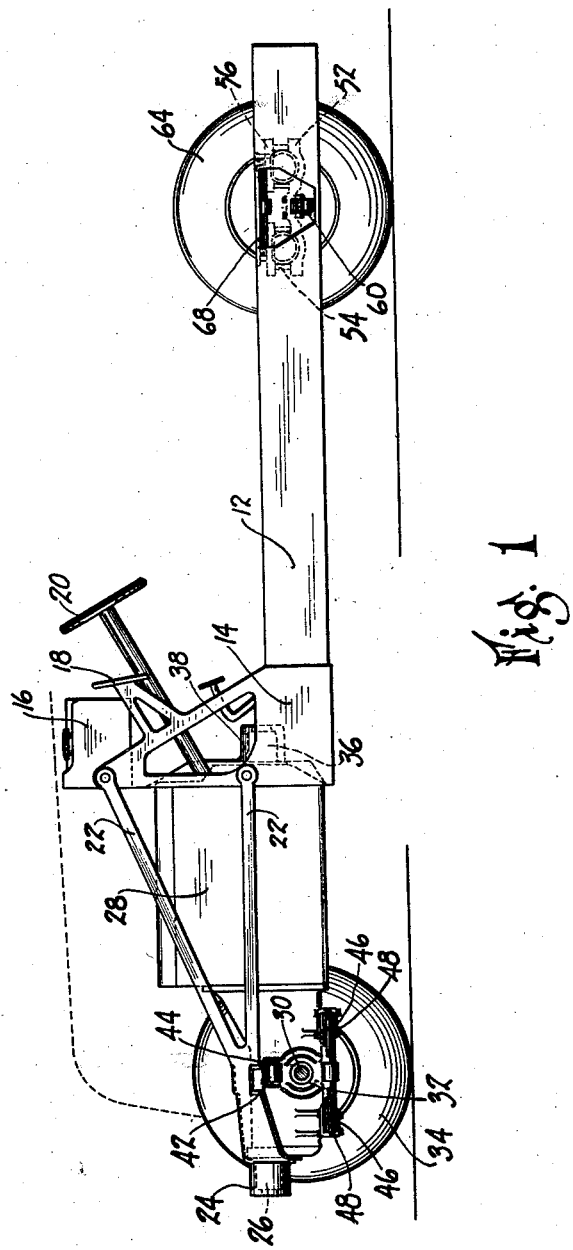

Nov. 3, 1936. V. W. KLIESRATH 2,059,245
MOTOR VEHICLE
Filed Jan. 14, 1933 4 Sheets-Sheet 3

INVENTOR.
VICTOR W. KLIESRATH
BY
ATTORNEY.

Nov. 3, 1936.   V. W. KLIESRATH   2,059,245
MOTOR VEHICLE
Filed Jan. 14, 1933   4 Sheets-Sheet 4
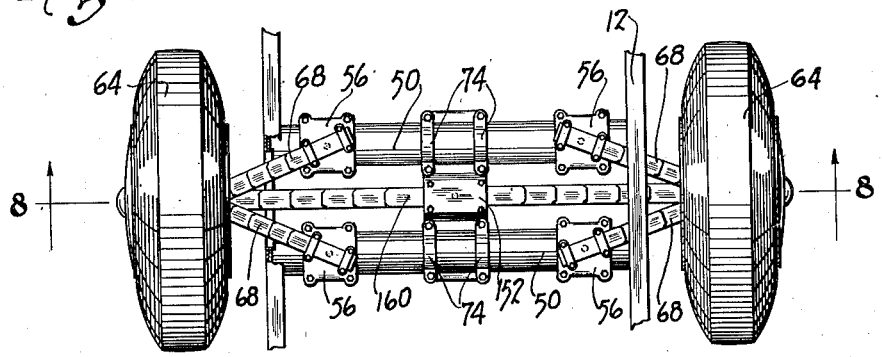
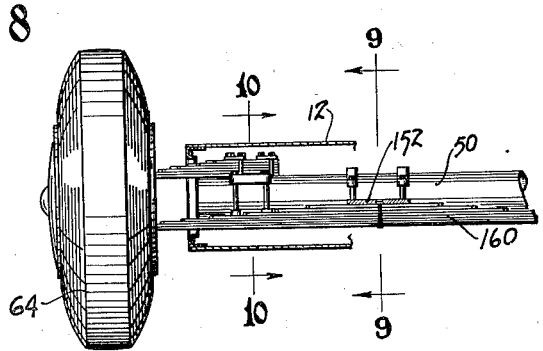
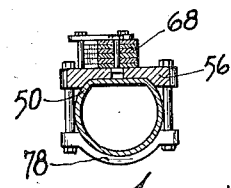
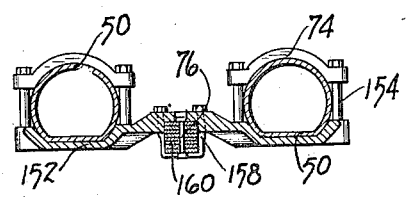
INVENTOR.
VICTOR W. KLIESRATH
BY
ATTORNEY.

Patented Nov. 3, 1936

2,059,245

UNITED STATES PATENT OFFICE 2,059,245

MOTOR VEHICLE

Victor W. Kliesrath, Port Washington, N. Y., assignor to The Steel Wheel Corporation, Chicago, Ill., a corporation of New York Application January 14, 1933, Serial No. 651,822

15 Claims. (Cl. 180—64)

This invention relates to motor vehicles, and is illustrated as embodied in an automobile of novel design having individually-sprung wheels and preferably also having the engine arranged to drive the front wheels. An object of the invention is to provide a simple and effective spring suspension for a vehicle of this type, and especially to arrange the parts of such a simplified spring suspension so that the torque reactions of the engine are transmitted through the spring suspension directly to the road wheels. This latter type of arrangement is particularly desirable when the engine drives the front wheels.

In one desirable arrangement the wheels are rotatably mounted at the outer ends of leaf springs arranged to have in effect a three-point connection with the sprung part of the chassis, the connections with the chassis being at points spaced substantial distances apart both lengthwise and vertically of the vehicle in such a manner as to transmit road shocks and other thrusts yieldingly thereto without any substantial transverse bending moment on any one of the springs, while at the same time there is provided a simple arrangement with relatively few parts.

The opposite ends of a single transverse leaf spring, or a pair of aligned leaf springs arranged end to end, are in the preferred embodiment arranged to cooperate at opposite sides of the vehicle with a pair of short horizontal leaf springs having their inner ends arranged a considerable distance apart and which converge outwardly until their outer ends meet substantially in vertical alignment with the corresponding outer end of the first mentioned transverse spring. Suitable knuckles or the like may be swiveled thereto for the front wheels, while the supports for the rear wheels are similarly connected but without any provision for swiveling movement.

According to an important feature of the invention, one set of these springs (the front set in the case of a front-wheel drive vehicle such as is illustrated) is not connected directly to the chassis frame or any part which is rigid therewith, but is connected to a part which is pivotally mounted with respect to the remainder of the chassis. This gives, with the spring suspension at the other end of the vehicle, what is in effect a three-point yielding suspension for the vehicle body.

Preferably the part which is thus pivotally mounted consists of a power unit, illustrated as including an internal combustion engine and a clutch and a change-speed gearing and a differential which drives the front wheels. This has the great additional advantage that the torque reactions of the engine are not transmitted to the vehicle frame in which the power unit is pivoted, but are transmitted through the novel spring suspension directly to the road wheels.

Other objects and features of the invention, including a novel arrangement of brackets for securing my spring suspension to parallel cross members at the rear of the vehicle, and other novel combinations of parts and desirable particular constructions, will be apparent from the following description of the illustrative embodiments shown in the accompanying drawings, in which:

Figure 1 is a vertical longitudinal section through the vehicle, just inside the left wheels;

Figure 2 is a front elevation of the vehicle shown in Figure 1;

Figure 3 is a top plan view of the power unit and the front wheels and the novel spring suspension which connects them;

Figure 7 is a plan view corresponding to Figure 4 but showing a modified arrangement;

Figure 8 is a partial vertical section through the modification on the line 8—8 of Figure 7;

Figure 9 is a section on the line 9—9 of Figure 8 showing the mounting for the transverse spring;

Figure 10 is a section on the line 10—10 of Figure 8, and showing mounting of one of the short springs; and Figure 11 shows one manner of providing a spring eye at the end of one of the springs.

Figure 4:
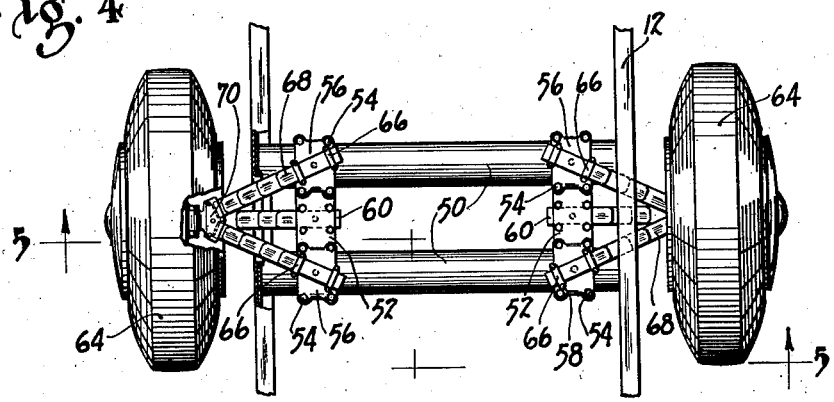
Figure 4 is a plan view corresponding to Figure 3 but showing the mounting for the rear wheels.

The vehicle selected for illustration as an embodiment of my invention is of the same general type as the one fully described and illustrated in my co-pending application No. 651,821, filed January 14, 1933. It is not my intention to claim in the present application any of the subject-matter claimed in the said co-pending application, nor any subject-matter disclosed therein except as it enters into the combination of the present invention.

This illustrative vehicle includes a box-section sheet steel base 12, forming in effect the equivalent of the usual chassis frame, and which (as explained in my said co-pending application) with the vehicle body, and the rear road wheels and their spring suspension, forms the rear section of the vehicle. The front section of the vehicle is shown as including a transversely extending dash 14 which is bolted or otherwise secured to the front end of the base 12 and which is shown as carrying the fuel tank 16 and the instrument board 18 and the steering wheel 20.

The dash 14 has bolted or otherwise secured thereto a forwardly-projecting rigid frame 22 having at the forward end of the vehicle a bearing 24 pivotally receiving a boss 26 formed on the front end of a power unit 28. The power unit 28, as more fully described and illustrated in my said co-pending application, preferably includes in one rigid unit an engine and a clutch and a change-speed transmission and a differential, the differential driving axle sections 30 extending through tubular housings 32 and operating through universal joints to drive the front road wheels 34. The power unit 28 is also formed at its rear end with a boss 36 pivotally mounted in a bearing 38 carried by the transverse dash 14.

By this arrangement the entire power unit 28 is supported for free pivotal movement with respect to the remainder of the chassis and therefore does not transmit to the chassis any of the torque reaction of the engine as it drives the wheels 34.

The axis of the pivotal movement in the arrangement shown is coincident with the axis of rotation of the engine crankshaft. According to an important feature of the invention the knuckles for the wheels 34 are swiveled to vertically-extending members (more fully described in my said prior application) which are connected by suitable pivot bolts to eyes (Figure 11) bolted or riveted or otherwise secured to the outer ends of leaf springs arranged in a novel manner to connect the wheels directly with the power unit 28, so that the load of the front end of the vehicle is supported on the pivots or bosses 26 and 36.

Preferably the novel spring suspension includes transverse spring means, shown as including a pair of horizontal leaf springs 42 arranged in alignment end to end, and with their inner ends seated in sockets formed on the upper side of the casing of the power unit 28, and secured in said sockets by bolting thereto detachable caps or the like 44. The lower ends of the wheel-carrying vertical members are similarly pivoted to the outer ends of pairs of short horizontal leaf springs 46 arranged with their inner ends spaced a substantial distance apart longitudinally of the vehicle, and converging outwardly so that their outer ends come substantially together in vertical alignment with the outer ends of the springs 42. The inner ends of the springs 46 are seated in sockets formed in the lower face of the housing of the power unit 28 and are rigidly held therein by caps 48 bolted or otherwise secured thereto.

It will be seen that the springs 42 and 46 form a three-point or pyramidal yielding support which not only supports the weight of the front end of the vehicle on the road wheels 34, but which also transmits yieldingly to the wheels the reaction torque of the engine which forms a part of the power unit 28.

Figure 6:
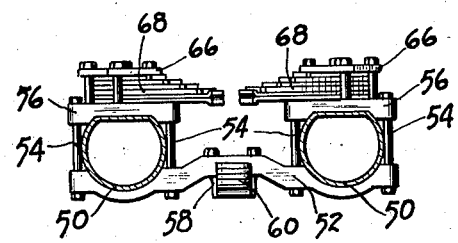
Figure 6 is a vertical section on the line 6—6 of Figure 5, and showing the left rear spring suspension.

At the rear end of the vehicle I preferably provide the base 12, which may be regarded as a substitute for the usual chassis frame, with a pair of parallel tubular reinforcing members 50, the cross-sectional form of which is shown in Figure 6. At opposite sides of the vehicle the lower faces of the reinforcing members 50 are engaged by a longitudinally-extending bracket member 52, which is clamped to the members 50 by bolts or the like 54 engaging upper brackets 56 seated on the upper faces of the members 50.

The brackets 52 have clamped to their central portions, as shown in Figure 6, by means such as U-bolts 58, transversely-extending horizontal springs 60, arranged end to end in alignment with each other, and which have eyes at their outer ends pivoted to the lower ends of knuckles or the like vertical wheel-carrying members 62 on which the road wheels 64 are rotatably mounted.

The brackets 56 have rigidly clamped thereto by means such as U-bolts 66, short horizontal leaf springs 68 arranged with their inner ends spaced a considerable distance apart longitudinally of the vehicle, and converging with their outer ends meeting substantially in vertical alignment with the corresponding end of a spring 60, and bolted or riveted to eyes 70 (Figure 4) pivoted to the upper ends of the knuckle members 62.

It will be seen that this construction also gives a three-point or pyramidal yielding mounting for the road wheels at the rear end of the vehicle.

Figure 5:
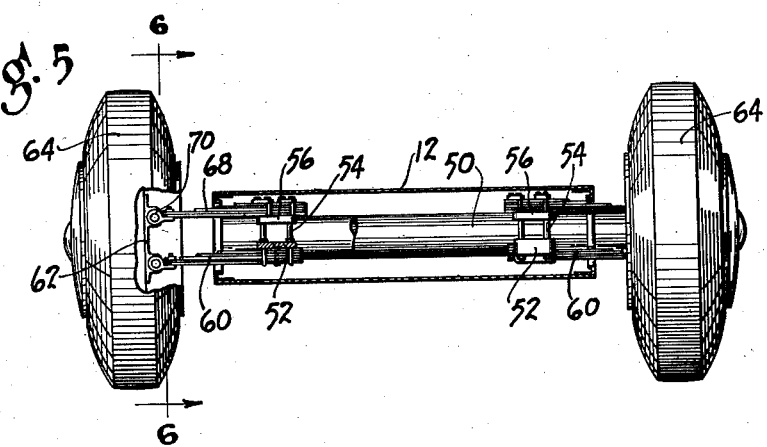
Figure 5 is a rear elevation of the vehicle, partly broken away on the line 5—5 of Figure 4, and showing the rear spring suspension.

The modification illustrated in Figures 7 to 10 differs from that just described, in that in place of the two aligned springs 60 there is a single transversely-extending horizontal spring 160 which extends entirely across the vehicle, and which is centrally secured by U-bolts 158 or the like to a bracket 152 secured to the cross members 50 by bolts 154 engaging caps 74 seated against the upper faces of the cross members 50. There may be a central bolt 76 through the spring to prevent shifting or creeping of the leaves with respect to each other. The converging springs 68 are secured as before to caps 56 the same as in Figures 4 to 6, except that the caps 56 cooperate with separate lower caps 78 instead of with a single longitudinally-extending bracket. In this case also the rear road wheels are provided with a yielding three-point or pyramidal connection to the vehicle body.

In all of the above-described arrangements, I prefer to make the effective lever arm of the upper spring slightly shorter than that of the lower ones, at each of the wheels. If they were exactly equal, they would constitute a form of parallelogram linkage that would move the wheel up and down with its plane at all times vertical, and this would cause the lowest point on the tire to move a short distance from and toward the center line of the vehicle (i. e. transversely of the wheel plane), which would to some extent increase tire wear. Making the effective upper link of the parallelogram slightly shorter than the lower one compensates for this by swinging the wheel plane slightly, to maintain the road-engaging point on the tire at all times the same distance from the vehicle center line, so that there is no "scuffing" of the tire.

While one illustrative embodiment has been described in detail, it is not my intention to limit the scope of the invention to that particular embodiment, or otherwise than by the terms of the appended claims.

I claim:

1. A vehicle having a chassis device, road wheels on opposite sides thereof, transversely-extending spring means substantially perpendicular to the center line of the vehicle and having the outer ends adjacent said wheels and secured to the chassis device and yieldingly supporting it, a pair of short leaf springs on each side of the vehicle having their inner ends spaced a substantially distance apart longitudinally of the vehicle and secured to said device and converging outwardly to bring their outer ends together in line perpendicularly with but spaced perpendicularly from the corresponding end of the spring means, and members rotatably supporting the wheels and each of which has a vertically-extending part in the load plane of the wheel and secured by pivotal connections to the outer end of the spring means and the outer ends of said springs on its side of the vehicle.

2. A vehicle having a chassis device, road wheels on opposite sides thereof, a transversely-extending leaf spring extending entirely across the vehicle substantially perpendicular to the center line of the vehicle and having its ends adjacent said wheels and secured to the chassis device and yieldingly supporting it, a pair of short leaf springs on each side of the vehicle having their inner ends spaced a substantial distance apart longitudinally of the vehicle and secured to said device and converging outwardly to bring their outer ends together in line perpendicularly with but spaced perpendicularly from the corresponding end of the transversely-extending spring, and members rotatably supporting the wheels and each of which has a vertically-extending part secured to the outer end of the transversely-extending spring and the outer ends of said springs on its side of the vehicle.

3. A vehicle having a chassis device including a pair of transverse parallel members, a transverse spring centrally secured to said members and projecting beyond the opposite ends of said members, brackets secured to said members adjacent their opposite ends, pairs of short springs secured at their inner ends to said brackets and each pair of which has its said inner ends spaced a considerable distance apart longitudinally of the vehicle and each pair of which converges outwardly to meet generally in vertical alinement with the corresponding end of the transverse spring, and a knuckle member at each side of the vehicle secured to the meeting ends of the corresponding short springs and to the corresponding end of the transverse spring and arranged rotatably to support a road wheel.

4. A vehicle having a chassis device including a box-section base and a pair of transverse parallel members within and secured to the sides of said base, transverse spring means substantially perpendicular to the center line of the vehicle and projecting through openings in the sides of said base beyond the opposite ends of said members, brackets secured to said members inside of said base adjacent their opposite ends, pairs of short springs secured at their inner ends to said brackets and each pair of which has its said inner ends spaced a considerable distance apart longitudinally of the vehicle and each pair of which converges outwardly to meet generally in vertical alinement with the corresponding end of the transverse spring means and which project through openings in the sides of said base, and a knuckle member at each side of the vehicle secured to the meeting ends of the corresponding short springs and to the corresponding end of the transverse spring means and arranged rotatably to support a road wheel.

5. A vehicle having a chassis device including a pair of transverse parallel members, transverse spring means substantially perpendicular to the center line of the vehicle and secured to said members and projecting beyond the opposite ends of said members, brackets secured to said members adjacent their opposite ends, pairs of short springs secured at their inner ends to said brackets and each pair of which has its said inner ends spaced a considerable distance apart longitudinally of the vehicle and each pair of which converges outwardly to meet generally in vertical alinement with the corresponding end of the transverse spring means, and means for rotatably supporting a wheel arranged at said vertically alined ends of the springs and the spring means at each side of the vehicle.

6. A vehicle having at each side three outwardly-extending springs having their inner portions spaced apart and having their outer ends substantially in vertical alinement and rotatably carrying a road wheel which is given a three-point connection to the vehicle by said springs, and a single support for the inner ends of the three springs at each side having parts spaced vertically and longitudinally and each of which parts receives the end of one of the three springs, whereby said three springs in effect form a pyramid with its base formed by said support and with a vertically-extending wheel support at its apex.

7. A vehicle having a base structure including longitudinally extending side members, brackets carried by said base at opposite sides of the vehicle substantial distances inwardly of said side members, yielding devices mounted on said brackets with their inner ends spaced apart both vertically and longitudinally of the vehicle and which project outwardly past the side members, at least one of said yielding devices being a leaf spring, the outer ends of said devices being substantially in vertical alinement and rotatably carrying a road wheel which is given a three-point connection to the vehicle by said devices.

8. A vehicle power unit movably mounted on a vehicle frame and having transverse leaf spring means secured thereto, and having at opposite sides short converging yielding devices which with the ends of said transverse spring means rotatably carry a pair of road wheels whereby said spring means and said yielding devices support the power unit and through it the vehicle frame and also yieldingly restrain the movement of the power unit.

9. A vehicle power unit having a transverse spring secured thereto, and having at opposite sides pairs of short converging springs which with the ends of said transverse spring rotatably carry a pair of road wheels, in combination with means for pivotally supporting said unit, pivotal movement of the unit on said means being yieldingly restrained by said springs.

10. A vehicle power unit movably mounted on a vehicle frame and having transverse spring means secured thereto, and having at opposite sides short converging springs which with the ends of said transverse spring means rotatably carry a pair of road wheels, whereby said springs support the power unit and also yieldingly restrain its movement.

11. A vehicle power unit having transverse spring means secured thereto, and having at opposite sides pairs of short converging springs which with the ends of said transverse spring means rotatably carry a pair of road wheels, in combination with a support on which said unit is pivoted for movement about a longitudinal axis, pivotal movement of the unit on said support being yieldingly restrained by said spring means and said springs.

12. A vehicle power unit movably mounted on a vehicle frame and having transverse spring means secured thereto, and having at opposite sides short converging springs which with the ends of said transverse spring means rotatably carry a pair of road wheels, whereby said springs support the power unit and also yieldingly restrain its movement, together with shafts drivably connecting the power unit and said wheels, and means for transferring the reaction torque of said power unit through said springs and spring means to said wheels.

13. A vehicle power unit having transverse spring means secured thereto, and having at opposite sides pairs of short converging springs which with the ends of said transverse spring means rotatably carry a pair of road wheels, in combination with a support on which said unit is pivoted for movement about a longitudinal axis, pivotal movement of the unit on said support being yieldingly restrained by said spring means and said springs, and shafts drivably connecting the power unit and said wheels.

14. A vehicle having a frame with a power unit pivoted therein for movement about an axis extending longitudinally of the vehicle, a pair of short leaf springs arranged in alinement with each other transversely of the vehicle and having their inner ends secured to the opposite sides of said power unit, devices vertically spaced from the leaf springs and secured to the power unit at points spaced apart longitudinally of the vehicle and converging outwardly and having their outer ends vertically spaced from the ends of the corresponding leaf springs, and means rotatably carrying road wheels and each connected at one end to the outer end of the corresponding leaf spring and at its other end to the outer end of the corresponding converging device.

15. A vehicle having a frame with a power unit pivoted therein for movement about an axis extending longitudinally of the vehicle, a pair of short leaf springs arranged in alinement with each other transversely of the vehicle and having their inner ends secured to the opposite sides of said power unit, devices vertically spaced from the leaf springs and secured to the power unit at points spaced apart longitudinally of the vehicle and converging outwardly and having their outer ends vertically spaced from the ends of the corresponding leaf springs, and pairs of members which are swiveled together for movement about vertical axes, one member of each pair rotatably carrying a road wheel and the other member of each pair being connected at one end to the outer end of the corresponding converging device and at its other end to the outer end of the corresponding leaf spring.

VICTOR W. KLIESRATH.